United States Patent
Marra

[11] 3,867,229
[45] Feb. 18, 1975

[54] TIRE BUILDING DRUM
[75] Inventor: Theodore Marra, Barberton, Ohio
[73] Assignee: The Goodyear Tire & Rubber Company, Akron, Ohio
[22] Filed: Feb. 1, 1974
[21] Appl. No.: 438,811

[52] U.S. Cl................. 156/417, 156/415, 156/420
[51] Int. Cl....................... B29h 17/16, B29h 17/26
[58] Field of Search..... 156/110, 123, 394, 414–420

[56] References Cited
UNITED STATES PATENTS

| | | | |
|---|---|---|---|
| 2,335,169 | 11/1943 | Bostwick | 156/415 |
| 2,583,650 | 1/1952 | Hodgkins | 156/420 |
| 2,614,057 | 10/1952 | Ericson et al. | 156/415 |
| 2,655,977 | 10/1953 | Hodgkins | 156/415 |
| 3,547,733 | 12/1970 | Leblond | 156/420 |
| 3,644,162 | 2/1972 | Appleby et al. | 156/420 |
| 3,645,826 | 2/1972 | Henley | 156/416 |
| 3,785,894 | 1/1974 | Ling et al. | 156/415 |

Primary Examiner—Clifton B. Cosby
Assistant Examiner—John E. Kittle
Attorney, Agent, or Firm—F. W. Brunner; R. S. Washburn

[57] ABSTRACT

Collapsible tire building drum mountable on a tire building machine spindle without necessity of internal connections, which drum has a plurality of major and a plurality of minor drum surface support sections and a plurality of articulated links pivotally connected at their respective outer ends to the sections and at their respective inner ends to spiders fixed on a central tubular shaft member and with individual air cylinders operable to move, in an axial plane, the respective hinges of the articulated links to collapse and to expand the drum. The drum features also an air cylinder control means mounted on the central member for co-rotation therewith and which means is provided with a connectable/disconnectable terminal means in the form of a self-closing hose connector unit enabling the drum to be expanded or collapsed by temporary manual connection to an external supply of compressed air.

10 Claims, 3 Drawing Figures

TIRE BUILDING DRUM

The foregoing abstract is not to be taken as limiting the invention of this application, and in order to understand the full nature and extent of the technical disclosure of this application, reference must be made to the accompanying drawing and the following detailed description.

The present invention relates to tire building drums, particularly of the rigid segment collapsible type. More particularly, the invention relates to a rigid segment collapsible tire building drum in which the segments are permitted to move angularly of the axis as well as radially inwardly so as to facilitate the separation of individual segments from the tire built thereon.

Figure 2:
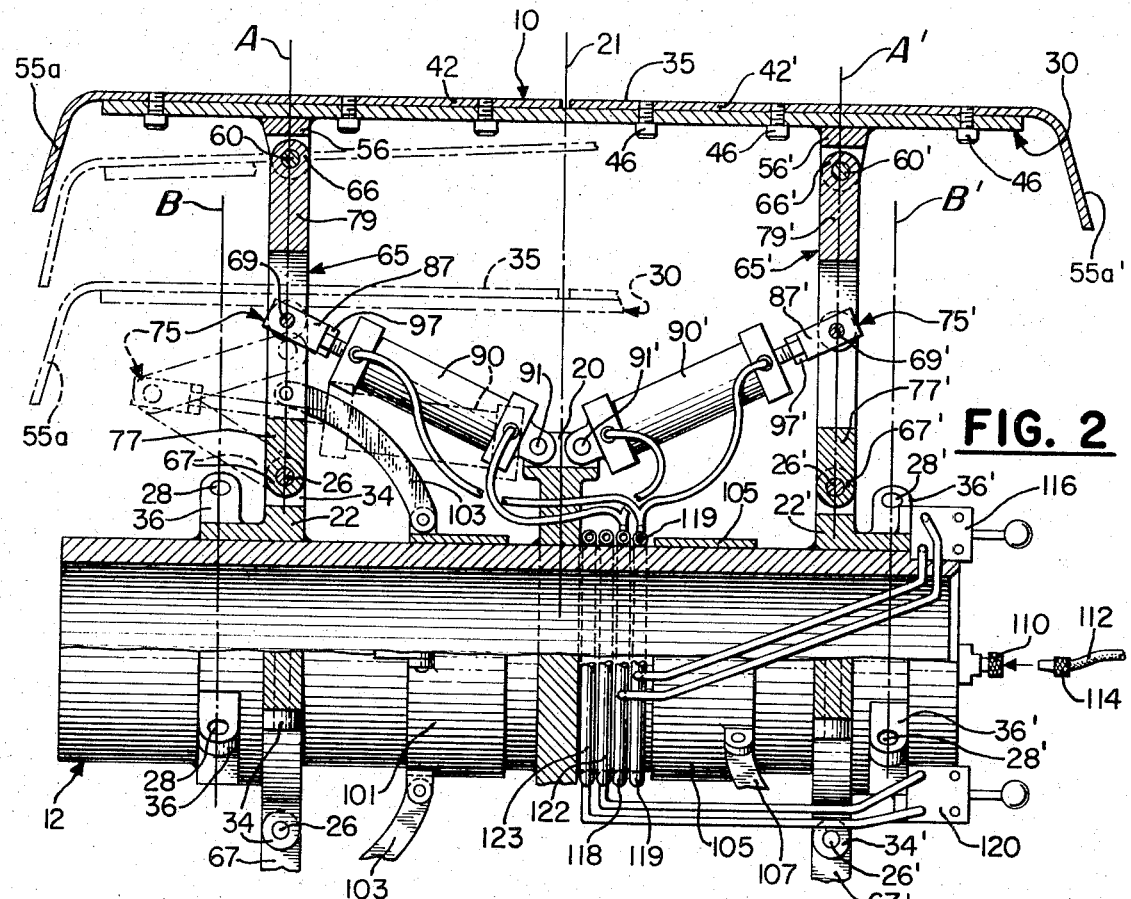
Figure 3:
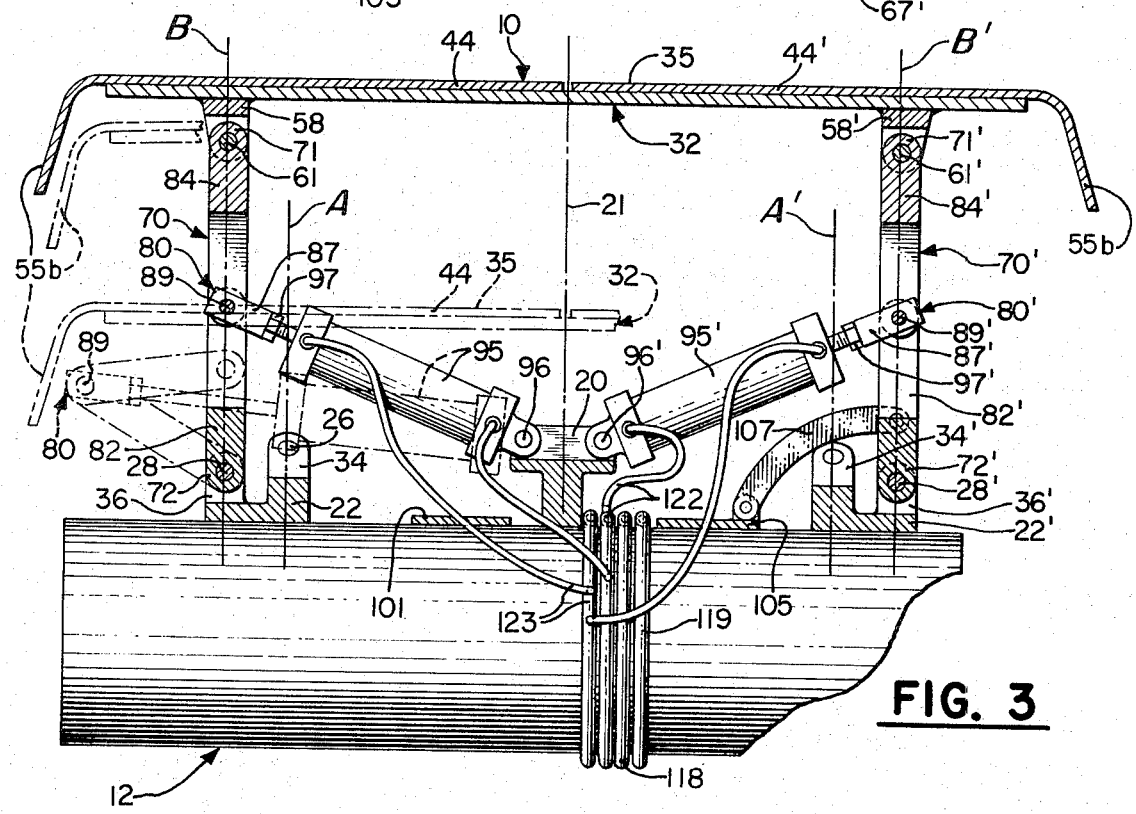
Figure 1:
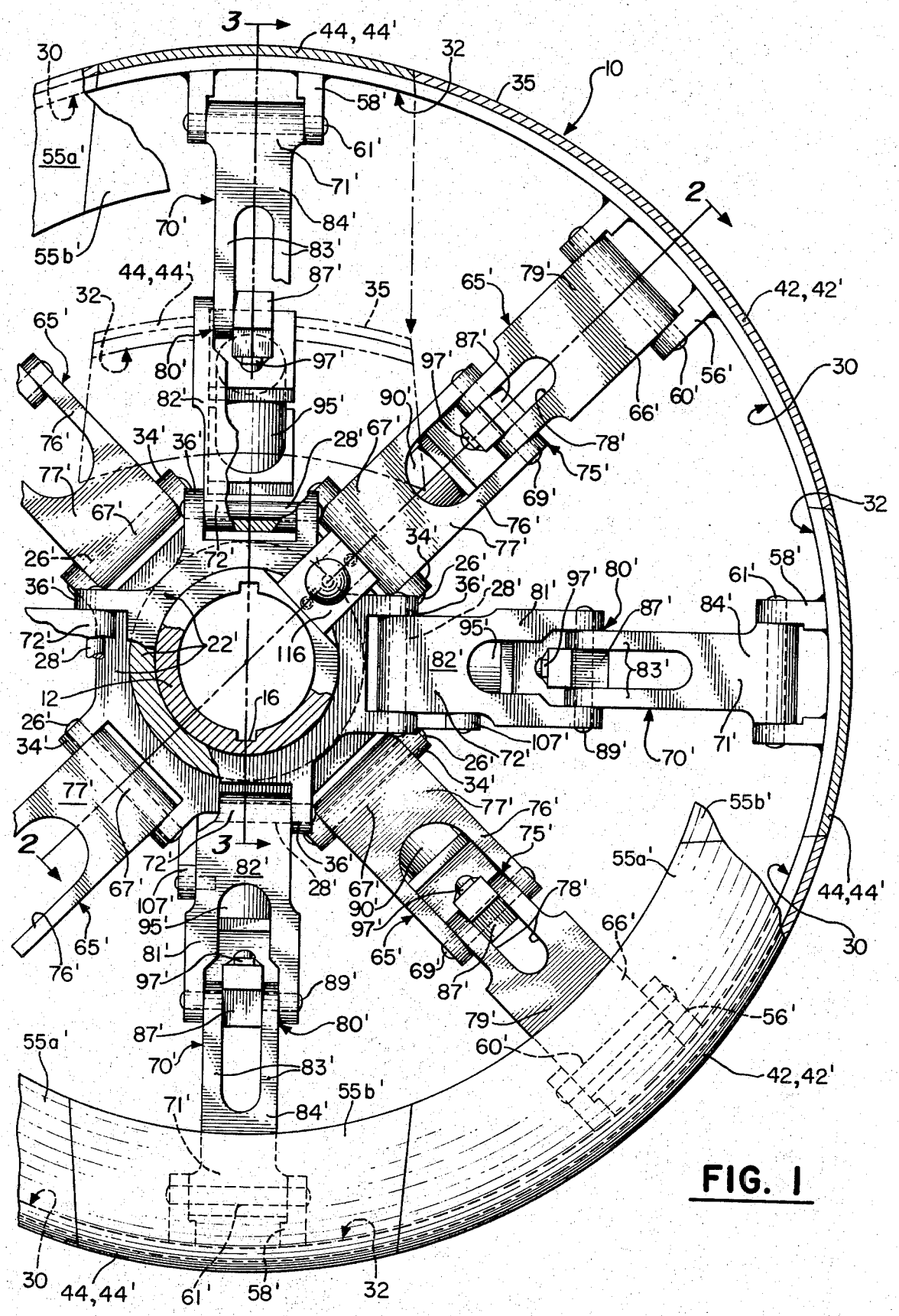

The object of the invention is to provide an improved tire building drum. Other objects and advantages will become evident or be particularly pointed out as the description proceeds, making reference to the attached drawings in which:

FIG. 1 is a view in end elevation of a tire building drum in accordance with the invention; and FIGS. 2 and 3 are respectively half section elevations viewed as indicated by the respective section lines 2 and 3.

Referring now to the drawings, in a preferred embodiment of the invention, the drum 10 includes a hollow tubular central member 12 which is adapted for mounting telescopically on a tire building machine center shaft (not shown) by sliding the drum and the central member axially along the center shaft. To provide for corotation between the drum and the shaft, any conventional means such as a key (not shown) and keyway 16 can be provided. A cylinder support ring 20 is secured on the central member to be a permanent part thereof as by welding. The ring is located in coplanar relation to the mid-circumferential plane 21 of the drum and of a tire constructed thereon.

A pair of spiders 22,22' are also secured coaxially on the central member 12 as permanent parts thereof as by welding. The spiders are spaced equally apart axially of the central member from the support ring 20. The spiders are identical in construction, but the spider 22 located at the drum end proximate to the building machine (not shown) is referred to herein as the inboard spider and the corresponding spider 22' at the other or distal end of the drum relative to the tire building machine is referred to as the outboard spider.

The collapsing-expanding mechanism of the drum 10 is symmetrical except as noted with respect to the mid-circumferential plane 21. In the description below, the parts of the drum at the inboard side of the plane 21 will be described fully and identified by appropriate numerals in the drawing; the corresponding parts at the outboard side of plane 21 will be identified by like numerals distinguished by prime marks (').

Each spider accommodates a plurality of pivot pins 26,28 equiangularly spaced about the axis of the drum. The pivot pins of the inboard spider 22 are disposed in two planes A and B each of which is perpendicular to the axis, the pins 26 lying in the first plane A being disposed alternately intermediate the pins 28 lying in the second plane B, as best seen in FIG. 1. As will presently appear, the pins 26 lying in the first plane A are associated with the major sections 30 of the drum while those pins 28 lying in the second plane B are associated with the minor sections 32. The first plane A is spaced axially inwardly closer to the mid-circumferential plane 21 than is the second plane B. Each of the pins 26 is accommodated in a trunnion 34 in Plane A, while the pins 28 are accommodated in trunnions 36 in plane B. In the drum 10, the pins 28 are disposed closer to the axis of the drum than are the pins 26. The trunnions are formed integrally with the spiders.

The building surface 35 of the drum can have any suitable form well known to persons skilled in the art. As customary in the art, the building surface is composed of arcuate segments divided one from the other by planes parallel to the axis, the number and arcuate extent of such segments corresponding to the number and arcuate extent of the underlying support sections 30,32 presently to be described. Also, as is customary, the segments 42,44, which are sometimes referred to as shells, are further divided at or parallel to the plane 21 to form half shells which can be moved axially apart to accommodate suitable spacers (not shown) so that the axial length of the building surface 35 can be altered. Moreover, the shells can be secured to the base sections in any suitable manner such as by the cap screws 46 illustrated. Since the segments or shells themselves form no part of the present invention, their further description is not deemed necessary.

According to the present invention, the drum includes a plurality of the drum surface support sections 30,32 which support the previously mentioned rigid cylindrical building surface segments 42,44,42',44', and which extend circumferentially continuously, while the drum is expanded, about the central member 12 and longitudinally the full axial length of the drum parallel to the drum axis. While there can be any suitable number of the sections 30,32, in the present embodiment the drum includes four major sections 30, so called because of their greater arcuate width, and four minor sections 32, so called because of their lesser arcuate width. The sections 30,32 cooperate in the expanded state of the drum 10 to form a circumferentially and axially continuous support for the previously mentioned shells or surface segments 42,44.

During normal use of the drum, the surface shells remain fixed to the respective support sections 30,32. It is a particular feature of the present invention that shells having radially inwardly turned flanges provided by the flange portions 55a,55b can remain fixed on their respective support sections without removal during the collapsing and expanding movements of the drum mechanism and without, as heretofore customary, the necessity of manually removing such flanges before the drum can be collapsed to remove the tire. For this purpose, each of the shells, attached respectively to the support sections 30,32 includes a radially inwardly and arcuately extending flange portion 55a, 55b, respectively, and such flange portions cooperate in the expanded state of the drum to provide a circumferentially continuous carcass building support flange at each end of the drum contiguous to and turned radially inwardly of the cylindrical building surface 35.

Each of the base support sections 30,32 of the drum has, in a plane parallel the drum axis, a pair of pivot pin lugs secured to or made integral with the respective support section. The pin lugs 56,56' are placed on the major sections 30 (FIG. 2) and the pin lugs 58,58' on the minor sections 32 (FIG. 3). Each pin lug 56,58 accommodates respectively a pivot pin 60,61 extending in planes perpendicular to the drum axis. The pin lugs 56 and pins 60 which are secured to the major sections 30 are preferably disposed in plane A coplanar with the pivot pins 26. The pivot pins 61 and pin lugs 58 associated with the minor sections 32 are preferably disposed in plane B coplanar with the pins 28 of the spider 22.

The drum 10 is collapsed and expanded by a plurality of articulated links 65 each of which is pivotally connected at its radially outer end 66 to an associated one of the pivot pin lugs 56 and at its radially inner end 67 to the spiders 22 by a respective one of the pivot pins 26 and a plurality of articulated links 70 each similarly connected at its radially outer end 71 to an associated pin lug 58 and at its radially inner end 72 to one of the pivot pins 28. Each of the articulated links is provided with an articulating hinge 75,80 between its respective radially outer and inner ends. The hinge 75 in each of the articulated links 65 comprises a hinge pin 69 by which the bifurcated portion 76 of the radially inner part 77 of the link 65 is hingedly connected to a conjugately bifurcated portion 78 of the outer part 79 of the link 65. In like manner, the bifurcated portion 81 of the radially inner part 82 of each link 70 is connected to the bifurcated portion 83 of the radially outer part 84 of the link 70 by the hinge pin 89. In the preferred embodiment described, the hinge pins 69 are located between and radially equidistant from the corresponding pivot pins 60 and 26 of the associated links 65 and the hinge pins 89 are likewise located between and radially equidistant from the pins 61 and 28 of the links 70. It is contemplated within the scope of the invention that the hinge pins can be located radially either farther from or closer to the pin carried by the spider as may be dictated by the particular length and diameter of the drum 10.

As will be apparent from FIGS. 2 and 3, the hinges 75,80 permit each link to move from the drum expanded position illustrated in solid lines, to the drum collapsed position illustrated in phantom lines. It is further a particular advantage in accordance with the invention that the links at the outboard end of the drum can articulate independently of the links located at the inboard end of the drum. This feature provides the distinct and unusual advantage in that the sections 30,32 of the drum and the shells thereon are not compelled to pull away from a tire on the drum simultaneously over the full axial length of the shells. By operating the links 65,70 and 65',70' without positive mechanical interrelation of their movements, the shells can be pulled away from the interior surface of the tire or carcass angularly, as is illustrated by phantom outlines of the sections 30,32 in FIGS. 2 and 3, in an intermediate position thereof, as well as radially of the drum axis.

Depending on the degree of adhesion of an uncured tire on the drum, the surface of the drum segments can break, or "peel" away from the tire because the links 70,70' are not mechanically required to move in timed relation with each other, nor are the links 65 and 65'. Thus, one end of each segment can lead the other end in radially inward movement as the drum is collapsed. This feature has the advantage of requiring less force to effect separation between the shell and the carcass and contributes as well to less deformation in a tire carcass during collapse of the drum.

To actuate the links 65,70, a plurality of air cylinders 90,95 are connected by suitable rod end fittings 87 to the hinge pins 69 and 89 of the respectively associated links. The head end of each cylinder 90 is pivotally connected by a pin 91 to the cylinder support ring 20 in the manner illustrated in FIG. 2. The head end of each cylinder 95 is connected pivotably to the ring 20 by a pin 96 as seen in FIG. 3. As will be noted in FIGS. 2 and 3, the pins 91 are more distant radially from the drum axis than are the pins 96. While air cylinders, such as those illustrated in the drawings, are preferred, it will be apparent that equivalent thrust devices, such as hydraulic cylinders or screw jacks, could be substituted for the air cylinders. It will also be apparent that the air cylinders or equivalent devices can equally well be reversed in position end for end from that shown in the FIGS. 2 and 3 when space permits; however, the rod end fitting 87 is more conveniently accommodated in the bifurcated portions 78 and 83 of the radially outer parts 79 and 84 of the respective links 65,70. It is important that the stroke available in each of the cylinders 90 and 95 be correlated with the movement of the respectively associated hinge pins 69 and 89 between the drum expanded and drum collapsed positions. It is also of advantage to provide cylinders which are equipped with conventional cushion means at each end of the stroke so as to minimize impact shock which otherwise can occur as the piston reaches the end of its stroke in either direction.

To adjust the position of each hinge pin to a coplanar relation with the pins at the inner end and at the outer end of the respectively associated link while the drum is in its expanded condition, each rod end fitting 87 is threaded to receive a correspondingly threaded end of the associated piston rod so that by relative rotation between the fitting and the rod the position of the pin can be suitably adjusted. A conventional lock nut 97 engaging the threaded piston rod end is then tightened against the rod end fitting so as to fix such adjustment.

It is also contemplated within the scope of the present invention that the cylinder support ring 20 be omitted and that a plurality of single cylinders each connected at its rod end to the hinge pin of an associated one of the outboard articulated links and at its head end to the hinge pin of the corresponding inboard articulated link can be substituted for the cylinders 90,95 illustrated and described herein. It will be apparent that as such single cylinders are expanded, the hinge pins of the respective articulated links will be moved apart from each other to collapse the drum and toward each other to expand the drum in a manner similar to the movements herein described.

The drum according to the invention can, optionally, be provided with a collar 101 surrounding and slidable along the central member 12 between the cylinder support ring 20 and the spider 22 and with a plurality of timing links 103 each of which is pin connected to the collar 101 at one of its ends and to a respectively associated one of the articulated links 65 such that the collar 101 and the timing links 103 associated with the major sections 30 compel each of the major sections at, for example, the inboard end of the drum to move radially together in timed relation radially of the drum. A similar collar 105 surrounding and slidable along the central member can also be provided, optionally, according to the invention, with a plurality of timing links 107 each pin connected at one of its ends to the collar 105 and at the other of its ends to one of the articulated links 70 associated with the minor sections 32 so that the minor sections are moved together in timed relation at the other end of the drum. It is to be noted that the respective collars 101,105 and associated timing links do not in any way inhibit the desired angular movement of the respective sections or the shells during collapse of the drum and separation of the tire therefrom.

It will be noted also that the collars 101,105 and associated timing links 103,107 are not disposed symmetrically of the plane 21 and that either collar 101 or 105 can be connected either to the articulated links 65 or to the links 70 and utilized either at the inboard or outboard end of the drum.

A further feature of the invention is the provision of control means for actuating the cylinders 90 and 95 to expand and to collapse the drum, which control means is mounted on and rotates with the drum. This is in contrast to the conventional tire building drum in which the powered operation of the drum is controlled by means situated in the tire building machine housing, or otherwise remote from the drum itself, and requires that connecting air passages or the like be provided within the building machine spindle to communicate with the operating mechanism within the drum.

Turning again to FIGS. 2 and 3, in the drum 10, the air cylinder control means for the drum comprises air cylinder power supply terminal means in the form of a self-closing hose coupling 110 and a pair of manually controlled valves 116 (FIG. 2) and 120 (FIG. 3), each of which is fixed on the central member 12 at the outboard end of the drum. The coupling 110 is connected to each of the respective inlet ports of the valves. A plurality of air flow manifolds 118,119,122,123 are fixed on the central member 12 and extend around it close to the cylinder support ring 20. The manifolds 18 and 19 are connected for air pressure communication respectively to the closed ends of the cylinders 90,90' and to one of two controlled air delivery ports of the valve 116. In a similar manner, the manifold 119 is connected to the rod end ports of the cylinders 90,90' and to the other of the controlled delivery ports of the valve 116.

The manifold 122 is connected to the closed or head ends of the cylinders 95 and 95' and to one of the two controlled delivery ports of the valve 120 while the manifold 123 is connected in like manner to the rod ends of the cylinders 95,95' and to the other of the two controlled delivery ports of the valve 120.

The valves 116 and 120 are manually operated three position, four way closed center valves. The valve 116 is connected so that in a first position pressure is admitted to the head ends and exhausted from the rod ends of the cylinders 90 to extend their piston rods to articulate the links 65 and 65' to move the sections 30 radially inwardly. Upon being manually set in a second position, the valve 116 is reversed to admit air to the rod ends and exhaust air from the head ends of the cylinders 90,90' so as to retract their piston rods, move the articulated links 65,65' to their straight radially extended position so as to move the sections 30 radially outwardly to their expanded position. In its third position, the valve 116 is closed, preventing flow to or from the cylinders 90,90' and the sections 30 are thereby prevented from radial movement.

The cylinders 95,95' are connected in like manner by way of the manifolds 122 and 123 such that manual setting of the valve 120 in selected positions operates to move the sectors 32 radially inwardly or radially outwardly in an identical manner.

In operation, the drum 10 is expanded by manually making connection, for compressed air flow, of the hose flexible 112 and its coupler 114 with the coupler 110 mounted on the drum. The manual valve 116 is then moved from its closed center position to its "expand" position whereupon compressed air flows by way of the manifold 119 to move the rods of cylinders 90,90' inwardly. The links 65,65' are thereby straightened to move the sections 30 outwardly to their fully expanded position. Then, the valve 120 is moved to its "expand" position whereupon compressed air is admitted by way of manifold 123 to move the rods of the cylinders 95,95' inwardly whereby the links 70,70' are straightened to their radially outward position moving the sections 32 likewise outwardly. The air supply hose is then removed.

To collapse the drum, having attached the air hose, first the valve 120 is positioned to its "collapse" position whereupon air is admitted by way of the manifold 122 to move the rods of the cylinders 95,95' outwardly so as to articulate the links 70,70' thereby moving the section 30 inwardly to their collapsed position. Then the valve 116 is positioned to its "collapse" position whereupon the air is admitted to the manifold 118 to move the rods of the cylinders 90,90' outwardly and fold the links 65,65' thereby moving the sections 32 inwardly to their collapsed position.

It will be understood that the respective cylinders and their associated sections operate only when air supply connection is made between the couplers 110 and 114. The mechanism as described remains in a fixed position when the couplers 110 and 114 are disconnected and the valves 116 and 120 are both in their centered positions.

The arrangement described for collapsing the drum 10 and the control means therefor are simple, low in cost, and effective. Although the valves 116 and 120 must be operated manually in the proper sequence as indicated to accomplish the collapse or expansion of the drum, inadvertent operation of the valves out of their indicated proper sequence cannot result in damage to the drum.

From the foregoing, it will be apparent that the drum according to the invention can be applied to and removed from a conventional tire building machine spindle without the necessity for making or unmaking any connections in or through the spindle to a supply of air or other power source. No elaborate rotary joints are required. From the external source, only a hose provided with a standard self-closing coupler cooperable with the unit mounted on the drum needs to be connected either to expand or to collapse the drum. This connection is made easily and quickly by an operator as may be required. This feature provides a further advantage that in any necessary maintenance to the drum, the drum can be collapsed or expanded while it is off the tire building machine spindle.

Among the advantages provided by the drum according to the invention are the fact that the drum as described can be expanded and collapsed without the necessity for removal of loose parts therefrom and the replacement of such parts before a next tire can be built thereon. The drum is provided with power operation for collapsing and expanding movements which is more efficient and requires less human effort and time than the conventional drum. It should be noted also that the sections are, by the self-closing effect of the coupler unit, self-locking not only in the expanded and in the collapsed states but at any intermediate state as such becomes convenient. The particular arrangement of the articulated links as described provides for a large difference between the diameter of the drum in its expanded state and the diametral extent of the surface segments in their collapsed state, thus providing greater radial clearance to facilitate removal of the tire built thereon, than heretofore available.

Because the drum employs standard, readily available, commercial air cylinders rather than "built in" actuators, such cylinders can be readily serviced or replaced more easily and at lower cost.

As has been mentioned hereinbefore, a particular advantage of the drum according to the invention is that the several sections are permitted to move angularly relative to the tire axis and are not compelled to move only perpendicular to the inside surface of such tire. This enables the segments to pull away from the inner surface of the tire progressively rather than all at once. Less force need be applied to collapse the drum and the tire is less subject to deformation than with collapsing drums of the prior art.

While certain representative embodiments and details have been shown for the purpose of illustrating the invention, it will be apparent to those skilled in the art that various changes and modifications may be made therein without departing from the spirit or scope of the invention.

What is claimed is:

1. A collapsible tire building drum for mounting telescopically on a tire building machine center shaft and for corotation therewith about a common longitudinal axis, comprising a hollow tubular central member slidable longitudinally on said shaft, a pair of spiders each fixed coaxially on the central member and spaced equally axially from a mid-circumferential plane of said drum, each spider accommodating a plurality of pivot pins equiangularly spaced about the central member in two planes perpendicular to said axis, the pins lying in the first such plane being disposed angularly about the axis respectively intermediate the pins lying in the second such plane, a plurality of drum surface support sections cooperable to support a rigid cylindrical building surface extending circumferentially continuously about said central member and longitudinally parallel to said axis, said plurality of sections including at least two major sections and at least two minor sections, a pair of pivot pin lugs secured to each of said support sections each accommodating a pivot pin extending in a plane perpendicular to said axis, a plurality of articulated links each pivotally connected at its radially outer end to one of said lugs and at its radially inner end to one of said spiders, and each such link having between its inner and outer ends an articulating hinge, a plurality of air cylinders, one of said cylinders being connected to each said link to move said hinge and to articulate such link in an axial plane so as to move each respectively associated support section between a drum collapsed and a drum expanded condition.

2. A collapsible tire building drum as claimed in claim 1, further comprising air cylinder control means carried on said central member for corotation therewith and provided with air cylinder power supply terminal means for connection to and disconnection from a stationary external supply thereof.

3. A collapsible tire building drum as claimed in claim 1, further including a radially inwardly extending flange portion attached to each end of each said sections, such flange portions cooperating in the expanded state of the drum to provide a circumferentially continuous building support flange at each end of the drum contiguous to and turned radially inwardly of the cylindrical building surface.

4. Apparatus as claimed in claim 1, wherein the plurality of articulated links associated with one axial end of said sections are movable independently of the articulated links associated with the other axial end of the drum, so that said sections can move angularly with respect to the drum axis during the collapse of said drum.

5. Apparatus as claimed in claim 1, further comprising a cylinder support ring fixed coaxially on said central member in coplanar relation with the mid-circumferential plane of the drum, each of said cylinders being pivotally connected at one of its ends to the respectively associated hinge and at the other of its ends to said cylinder support ring.

6. A tire building drum as claimed in claim 1, wherein the pin lugs secured respectively to said major sections and the articulated links connected respectively to such major sections are disposed respectively in coplanar relation with the pivot pins lying in said first such plane of the respective said spiders.

7. A tire building drum as claimed in claim 1, wherein the pin lugs secured respectively to said minor sections and the articulated links connected respectively to such minor sections being disposed respectively in coplanar relation with the pivot pins lying in said second such plane of the respective said spiders.

8. A tire building drum as claimed in claim 1, wherein the pivot pins at the radially inner ends of said articulated links associated with said minor sections are disposed closer to the axis of said drum than are the pivot pins at the inner ends of said articulated links associated with said major sections.

9. A tire building drum as claimed in claim 1, further including a collar surrounding and slidable along said central member axially inwardly of and between said spiders, a plurality of timing links each pivotally connected at one of its ends to said collar and at the other of its ends to a respectively associated one of said articulated links.

10. A tire building drum as claimed in claim 1, further comprising:
   air cylinder control means carried on said central member for corotation therewith and provided with air cylinder power supply terminal means for connection to and disconnection from a stationary external supply thereof;
   a radially inwardly extending flange portion attached to each end of said sections, such flange portions cooperating in the expanded state of the drum to provide a circumferentially continuous building support flange at each end of the drum contiguous to and turned inwardly of the cylindrical building surface;
   the plurality of articulated links associated with one end of said sections being movable independently of the articulated links associated with the other end of the drum so that said sections can move angularly with respect to the drum axis during the collapse of said drum;

a cylinder support ring fixed coaxially on said central member in coaxial relation with the mid-circumferential plane of the drum, each of said cylinders being pivotally connected at one of its ends to the respectively associated hinge and at the other of its ends to said cylinder support ring;

the pin lugs secured respectively to said major sections and the articulated links connected respectively to such major sections being disposed respectively in coplanar relation with the pivot pins lying in said first such plane of the respective said spiders;

pin lugs secured respectively to said minor sections and the articulated links connected respectively to such minor sections being disposed respectively in coplanar relation with the pivot pins lying in said second such plane of the respective said spiders;

the pivot pins at the radially inward ends of said articulated links associated with said minor sections being disposed closer to the axis of said drum than are the pivot pins at the inner ends of said articulated links associated with said major sections; and a collar surrounding and slidable along said central member axially inwardly of and between said spiders, a plurality of timing links each pivotally connected at one of its ends to said collar and at the other of its ends to a respectively associated one of said articulated links.

* * * * *